United States Patent [19]
Bizon

[11] Patent Number: 5,387,954
[45] Date of Patent: Feb. 7, 1995

[54] TRANSPARENCY MAGAZINE LOADING DEVICE

[75] Inventor: Stanley Bizon, Speers Point, Australia

[73] Assignee: Stan Bizon & Associates Pty Limited, Hamilton, Australia

[21] Appl. No.: 930,763

[22] Filed: Aug. 14, 1992

[30] Foreign Application Priority Data

Aug. 16, 1991 [AU] Australia .............................. PK7795

[51] Int. Cl.⁶ ............................................ G03B 23/02
[52] U.S. Cl. .................................... 353/103; 353/113
[58] Field of Search ............... 353/103, 104, 112, 113, 353/114, 115, 116, 120, DIG. 1, DIG. 3, DIG. 5; 206/455, 456; 353/111

[56] References Cited

U.S. PATENT DOCUMENTS

| 2,904,914 | 9/1959 | Trubert | 353/113 |
| 4,024,966 | 5/1977 | Schenck | 353/DIG. 1 |
| 4,338,738 | 7/1982 | Lamb | 353/111 |
| 4,354,745 | 10/1982 | Armstrong | 353/112 |
| 4,408,849 | 10/1983 | Sickles | 353/DIG. 1 |
| 4,485,611 | 12/1984 | Fuller | 353/112 |

Primary Examiner—William A. Cuchlinski, Jr.
Assistant Examiner—William C. Dowling
Attorney, Agent, or Firm—Leydig, Voit & Mayer, Ltd.

[57] ABSTRACT

A device for loading photographic transparencies into a magazine having transparency slots, said device comprising a chamber adapted to contain at least some of the transparencies, a feeder means for transferring one of the transparencies from the chamber to one of the slots in the magazine via a feeder gap and a slot positioning means for positioning the slot in alignment with the feeder gap.

17 Claims, 3 Drawing Sheets

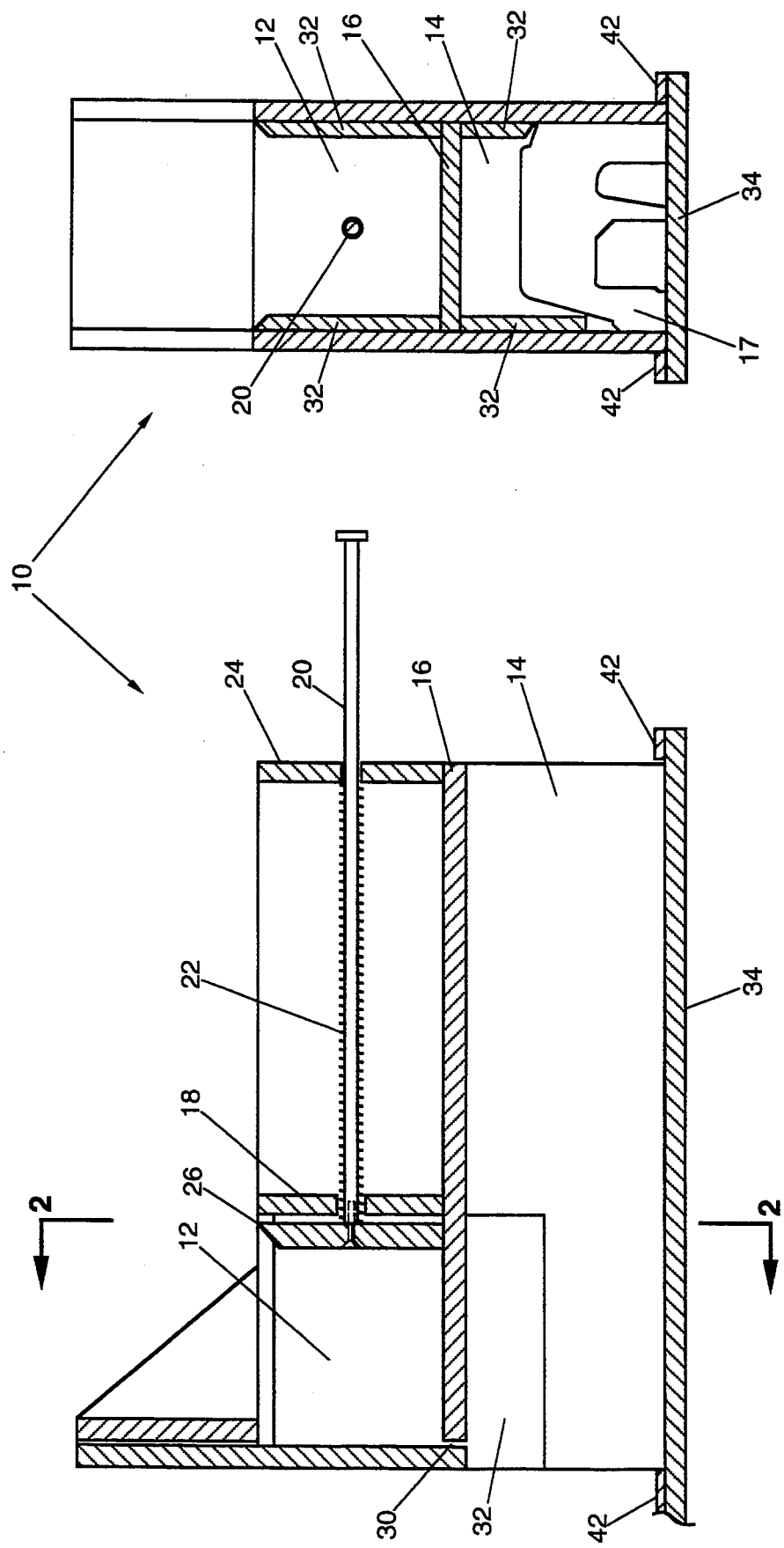

TRANSPARENCY MAGAZINE LOADING DEVICE

BACKGROUND OF THE INVENTION AND PRIOR ART

This invention relates to image projecting equipment. More particularly, it concerns a device which enables photographic transparencies to be loaded into a magazine of a projector or viewer. The term "photographic transparencies" refers to the type of transparency which has a rigid mount, made of cardboard of plastic, for example.

Known ways of loading photographic transparencies into a magazine of a projector or viewer involve a manual insertion of the transparencies one by one into the slots provided for this purpose in the magazine. This is a relatively slow task and one that requires certain precision. Other than being time consuming, it may also cause significant apprehension to people with various physical disabilities such as poor sight, arthritic conditions, etc.

It is an object of the present invention to overcome or at least substantially ameliorate some or all of these disadvantages and to provide a device which permits the rapid and accurate loading of photographic transparencies into the magazine of the projector or viewer.

Although the present invention will be described herein in connection with a magazine of a projector or viewer, it will be appreciated that the invention may find many different applications.

SUMMARY OF THE INVENTION

In one broad form, the present invention provides a device for loading photographic transparencies into a magazine having transparency slots, the device having:
a chamber adapted to contain at least some of the transparencies;
feeder means for transferring one of the transparencies from the chamber to one of the slots in the magazine via a feeder gap; and
slot positioning means for positioning the slot in alignment with the feeder gap.

Preferably, the device is manufactured from a plastic material such as perspex or the like. However, any other material such as steel, wood or the like which is capable of maintaining its shape under the conditions of use as well as its structural integrity, may also be suitable. Advantageously, the main body may be injection moulded.

The transparency chamber is provided to receive photographic transparencies therein prior to loading them into the magazine. It is especially preferred that the chamber is at least partially transparent so as to allow visual monitoring of the operation of the device.

The device may include detachable panels for reducing dimensions of the chamber. The purpose of the detachable panels is to enable the chamber to operate more efficiently in the case of small-sized transparencies, so that the transparencies may be contained snugly in the chamber. If desired, the detachable panels may also serve to reduce dimensions within the device in the region of at least some of the magazine slots. As will be clear to one skilled in the art after reading the description below, this serves to assist guidance of transparencies into the slot.

In a preferred embodiment of the present invention, there is a pressure plate in the chamber. The pressure plate is adapted to urge transparencies in the chamber towards the feeder gap. More preferably, there is sufficient force on the pressure plate to prevent any transparency from gravitating through the feeder gap.

It is preferred that the pressure plate is slidably received within the chamber and that a handle is affixed to the pressure plate for drawing the pressure plate away from the feeder gap. The handle and the pressure plate are adapted to slide longitudinally within the transparency chamber. A coil spring or the like is adapted to maintain the pressure plate in its frontmost position (towards the feeder gap) so that any transparencies in the transparency chamber are urged by the pressure plate towards the feeder gap.

The feeder means is provided to transfer photographic transparencies from the chamber to the slots in the magazine.

It is preferred that the feeder gap be wide enough to accommodate a single transparency in a thick mount, but not wide enough to permit two transparencies in thin mounts, to pass through. However, the width of the feeder gap may still need to be adjusted as mounts can vary greatly in thickness.

Thus, it is especially preferred that there is provided a feeder gap regulating means for varying the width of the feeder gap so that the device of the invention can be used in association with photographic transparencies of any mount thickness.

In one embodiment of the present invention, the feeder gap regulating means comprises a liner or the like adapted to be positioned within the chamber so as to project into the feeder gap. Ideally, the liner is placed on the floor of the chamber so as to narrow the feeder gap to the required width. Thus, by choosing a liner of a predetermined length, the feeder gap may be narrowed to accommodate a photographic transparency of the required mount thickness. Preferably, the pressure plate is abridged at the lower end thereof so as to allow the liner to be placed on the floor of the chamber and to prevent the pressure plate from contacting and displacing the liner.

Conveniently, the liner may be manufactured from a plastic material such as polyvinylchloride (PVC) or the like.

In another preferred embodiment of the present invention, a floor of the chamber serves as the feeder gap regulating means. The floor may be adapted to slide so as to vary the feeder gap to the required width in order to accommodate a photographic transparency of the required mount thickness.

A feeder tongue may be adapted to slide vertically within the chamber so as to assist the placement of photographic transparencies into the chamber prior to loading and to facilitate the loading of photographic transparencies into the magazine via the feeder gap.

The slot positioning means is provided so as to ensure an accurate placement of photographic transparencies into the magazine.

In a preferred embodiment of the present invention, the slot positioning means comprises a spacer member adapted to engage teeth which are a standard feature on magazines. Preferably, the spacer member is provided in the form of a lug. The lug may be integral with or rigidly affixed to a floor plate (on which the device can rest) and serves to engage the magazine by way of the magazine teeth which have the same spacing as the transparency slots in the magazine. This gives two main advantages. First, it allows an accurate alignment of the magazine so that the slot of the magazine, ready to receive a single transparency therein, is located correctly in relation to the feeder gap. Secondly, it restricts advancements of the magazine to predetermined intervals so as to ensure accuracy of each following alignment.

The floor plate may include guide rails to hold the device in position during loading of the magazine. If desired, the device can be removed from the floor plate for the purpose of removing the chamber.

The device of the present invention can be adapted to various types of magazines by altering the position of the spacer member on the device.

The device of the present invention can be adapted to accommodate circular slide magazines by modifying the device so that it straddles the magazine. In this embodiment the floor plate is enlarged and includes a raised ring made of any suitable material as previously described. The ring is adapted to fit an internal toothed ring of the magazine permitting the magazine to revolve smoothly. The spacer member, which once again may be a lug positioned on the floor plate, engages the teeth of the magazine and operates in the same manner and on the same principle as the lug used for loading a straight magazine.

The walls of the chamber and the pressure plate may be tapered to guide batches of transparencies into the chamber.

The skirts may be provided to hold the device of the present invention in spaced relationship from the magazine and to prevent the device from resting on the magazine.

BRIEF DESCRIPTION OF THE DRAWINGS

By way of example only some preferred embodiments of the present invention will now be described with reference to the accompanying drawings, wherein:

FIG. 1 is a sectional side view of one preferred embodiment of the magazine loading device of the present invention;

FIG. 2 is a sectional view, taken along line A—A of FIG. 1;

DETAILED DESCRIPTION OF THE DRAWINGS

Figure 3:
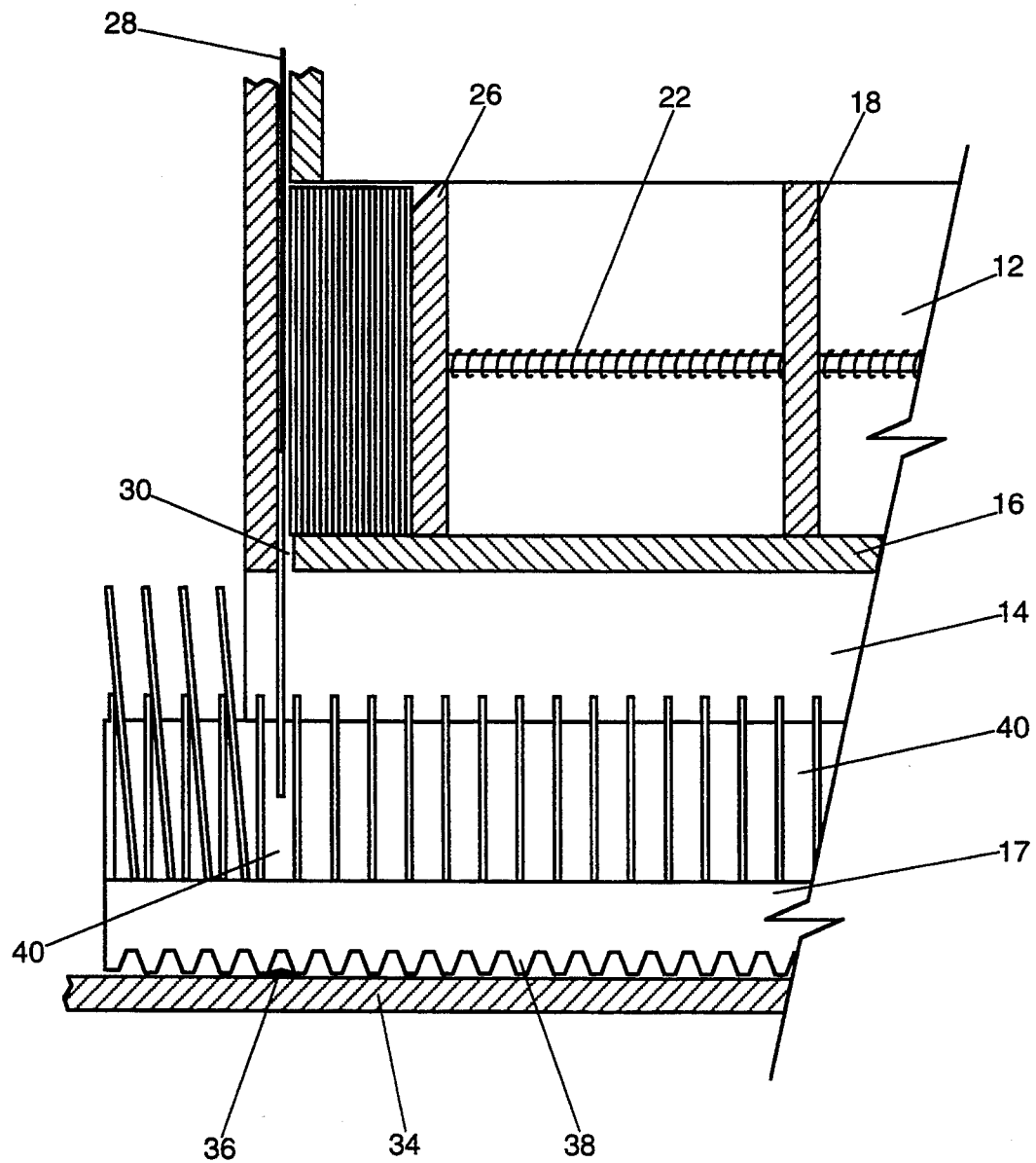
FIG. 3 is a view corresponding to part of FIG. 1, having a magazine therein.

Referring first to FIGS. 1 to 3, in the drawings there is depicted magazine loading device 10 having transparency chamber 12, magazine area 14 and dividing wall 16. Transparency chamber 12 is provided to receive photographic transparencies therein prior to loading into magazine 17 (refer FIG. 3), whereas magazine area 14 is adapted to receive magazine 17. Dividing wall 16 separates transparency chamber 12 and magazine area 14.

Transparency chamber 12 includes panel 18 which serves to support and guide handle 20. Panel 10 is rigidly affixed to and positioned within transparency chamber 12. Handle 20, having coil spring 22 (see FIG. 3), protrudes through back wall 24 of transparency chamber 12 at one end thereof and is rigidly affixed to pressure plate 26 at the other end. Coil spring 22 serves to maintain pressure plate 26 in its frontmost position (i.e., towards the left in FIG. 1) so that any transparencies in transparency chamber 12 are urged by pressure plate 26 towards feeder gap 30. Feeder tongue 28 (shown in FIG. 3) slides vertically within transparency chamber 12. Coil spring 22 provides sufficient pressure on transparencies within transparency chamber 12 in order to prevent transparencies from falling through feeder gap 30 when feeder tongue 28 is in its raised position.

In embodiment as illustrated in FIGS. 1-3, feeder gap 30 is wide enough to accommodate a single transparency in a thick mount, but not wide enough to permit two transparencies in thin mounts to pass through.

In the preferred embodiment, feeder gap 30 could permit two transparencies in thin mounts to pass through, except that feeder gap 30 is made narrower by a liner placed on the floor of transparency chamber 12. Liner is sized to fit snugly on the floor of chamber 12 against panel 18 and projects into feeder gap 30 to the required extent, so as to narrow feeder gap 30 to the required width. An assortment of liners of varying length may be provided so that, by choosing a liner of a predetermined length, feeder gap 30 may be narrowed to accommodate one, but not two, photographic transparencies of the selected mount size. Pressure plate 26 is abridged at the lower end thereof to allow placement of liner on the floor of transparency chamber 12 and so that pressure plate 26 does not contact and therefore displace liner.

Side panels 32 (FIGS. 1 and 2) are located within transparency chamber 12 and magazine area 14 and are rigidly but detachably attached thereto by any suitable means in known manner. Side panels 32 serve to adjust the internal parameters of chamber 12 and magazine area 14 in order to accommodate different types and sizes of transparencies.

Floor plate 34 and lug 36 (see FIG. 3) are provided to ensure accurate placement of photographic transparencies into magazine 17. Device 10 rests on floor plate 34. Lug 36 is rigidly affixed to floor plate 34 and serves to engage magazine 17 by way of teeth 38 which are a standard feature of all commercially available magazines and which have the same spacing as transparency slots 40 in magazine 17. This gives two main advantages. First, it causes an empty slot 40 to be accurately aligned below feeder gap 30, so that a single transparency can be loaded into magazine slot 40. Secondly, it permits magazine 17 to advance at predetermined intervals so as to ensure accuracy of each following alignment.

Guide rails 42 (refer FIG. 2) are provided to hold device 10 in position on floor plate 34 during loading of magazine 17.

As illustrated in FIG. 2, pressure plate 26 and side panels 32 are tapered at the top thereof to guide batches of transparencies into transparency chamber 12.

In order to operate magazine loading device 10, it is placed on floor plate 34 in the position dictated by guide rails 42. A recess (not shown) in the skirt of device 10 engages lug 36. Magazine 17 is positioned inside magazine area 14 so that teeth 38 engage lug 36. Feeder tongue 28 is, at this point, in its downward position within feeder gap 30 which is accurately aligned with an empty magazine slot 40. Handle 20 is withdrawn so as to compress coil spring 22 and a batch of one or more transparencies is placed in the space between feeder tongue 28 and pressure plate 26. Handle 20 is then released and the batch of transparencies is urged by coil spring 22, acting on pressure plate 26, towards feeder gap 30 and against feeder tongue 28.

When feeder tongue 28 is raised to a point when it clears the transparencies, coil spring 22 acts on pressure plate 26 to force the batch forward until the first transparency occupies the space previously taken by feeder tongue 28. Coil spring 22 provides sufficient pressure in order to prevent the transparency from gravitating through feeder gap 30. The transparency is then loaded into magazine 17 by a full downward motion of feeder tongue 28.

In order to load the next transparency, feeder tongue 28 is raised again, allowing the next transparency to take its place. At the same time, magazine 17 is advanced forward manually; lug 36 ensures that magazine 17 advances one space only so as to again align feeder slot 30 and the next empty magazine slot 40, which is now ready to receive the next transparency. The transparency is loaded into magazine 17 by another full downward motion of feeder tongue 28.

Magazine 17 is loaded by repeating the loading procedure and can be removed from magazine area 14 at any time, when either fully or partially loaded, by pulling magazine 17 forward (to the left in FIG. 3) out of loading device 10. Alternatively, device 10 may be lifted from floor plate 34.

Magazine loading device 10 can be adapted to any type and size of transparency by altering the height, length and/or thickness of side panels 32.

Figure 4:
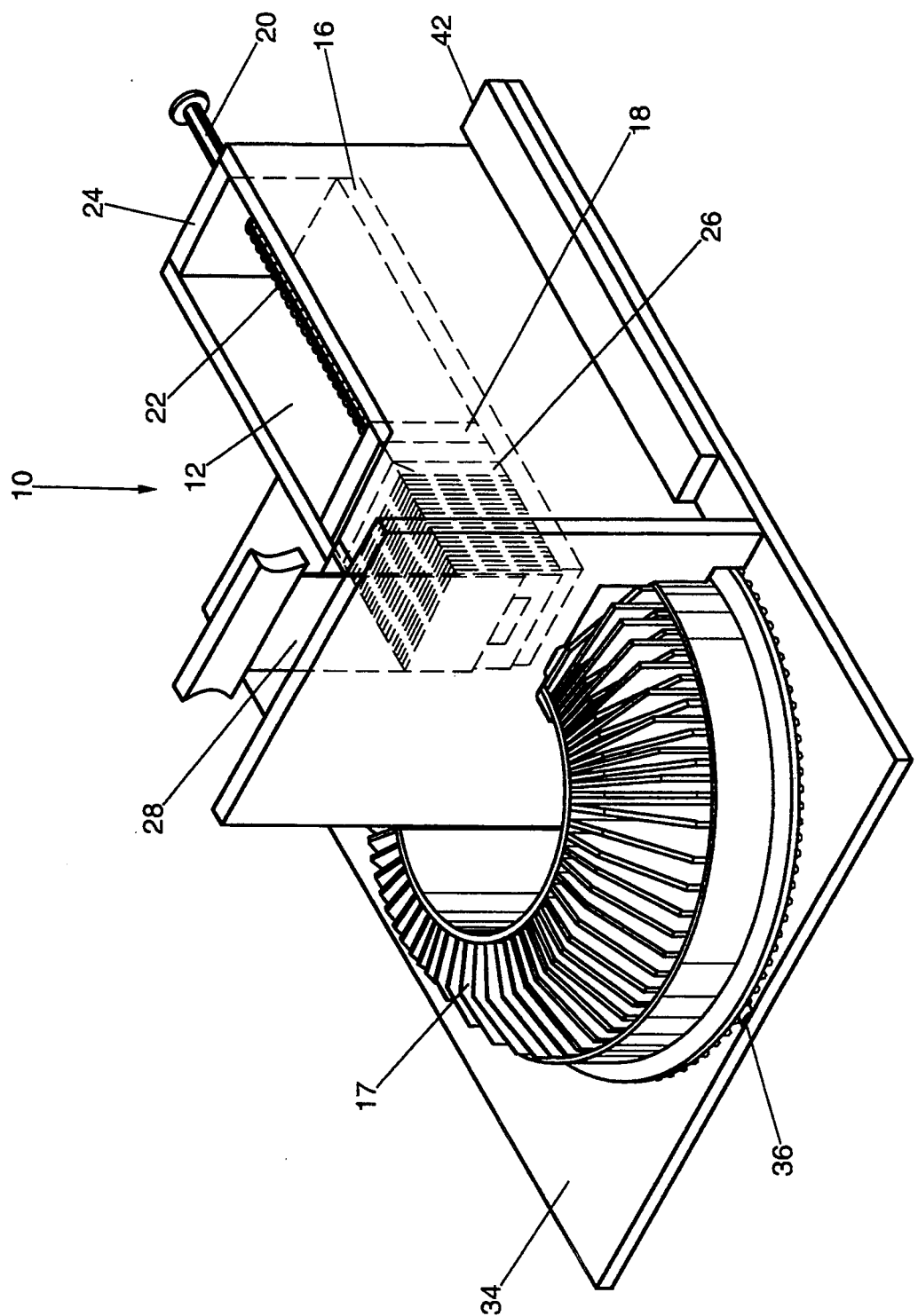
FIG. 4 is a perspective view of another preferred embodiment of the magazine loading device of the present invention.

Referring now to FIG. 4, in the drawing there is depicted a magazine loading device 10 adapted to load circular slide magazines by altering the shape of the front wall of magazine loading device 10 so that it supports the device by straddling magazine 17. Floor plate 34 includes a raised ring (not shown). The ring is adapted to fit to an internal toothed ring (not shown) in the base of magazine 17 assisting the magazine 17 to revolve smoothly around the raised ring.

Apart from these changes, magazine loading device 10 operates in the same manner as already described in connection with FIGS. 1 to 3.

It is envisaged that the introduction of the magazine loading device of the present invention will simplify the process of loading photographic transparencies into magazines resulting in a reduction of the time needed to perform the task. Further, the magazine loading device of the present invention will bring significant relief to those people with various physical disabilities who are currently unable to or limited in performing the task.

It will be appreciated that the magazine loading device of the present invention is simple while at the same time it addresses the problems of the prior art. It will be further appreciated that the preferred embodiment of the present invention disclosed herein is not intended to be limiting on the scope of the invention. Other forms of the invention will be apparent to those skilled in the art and are not considered to be beyond the scope of the present invention.

I claim:

1. A device for manually loading photographic transparencies into a magazine having transparency slots, the device having:
   a transparency chamber adapted to contain at least some of the transparencies and including a floor upon which the transparencies rest;
   support means for supporting the transparency chamber above the magazine in use;
   feeder means for transferring one of the transparencies from the transparency chamber to one of the slots in the magazine via a feeder gap in the floor, the feeder means comprising a feeder tongue adapted to directly engage and to force a transparency in the transparency chamber downwards through the feeder gap; and
   slot positioning means for positioning the slot in alignment with the feeder gap, the slot positioning means comprising a spacer means fixed relative to the transparency chamber adapted to engage teeth on a bottom of the magazine which, in engagement with the teeth on the magazine, restricts manual advancement of the magazine to predetermined intervals.

2. The magazine loading device as claimed in claim 1, wherein the transparency chamber has a pressure plate adapted to urge transparencies in the transparency chamber towards the feeder gap with sufficient force to prevent any transparency from gravitating through the feeder gap.

3. The magazine loading device as claimed in claim 2, wherein the pressure plate is slidably received in the transparency chamber and is attached to a handle for drawing the pressure plate away from the feeder gap.

4. The magazine loading device as claimed in claim 3, wherein a coil spring on the handle is adapted to cause the pressure plate to urge transparencies in the transparency chamber towards the feeder gap.

5. The magazine loading device as claimed in claim 1, wherein the feeder gap is dimensioned in width so as to permit one transparency in a thick mount, but not two transparencies in thin mounts, to pass therethrough.

6. The magazine loading device as claimed in claim 1 which includes a feeder gap regulating member for varying the width of the feeder gap.

7. The magazine loading device as claimed in claim 6, wherein the feeder gap regulating member comprises a liner adapted to be positioned within the transparency chamber so as to reduce the width of the feeder gap by projecting thereinto.

8. The magazine loading device as claimed in claim 6, wherein the floor of the transparency chamber is adapted to slide so as to vary the width of the feeder gap.

9. The magazine loading device as claimed in claim 1, wherein the spacer member is a lug.

10. The magazine loading device as claimed in claim 1, wherein the spacer means is integral with or affixed to a floor plate supporting the magazine loading device.

11. The magazine loading device as claimed in claim 10, wherein guide rails are provided on the floor plate to hold the device in position during loading of the magazine, the device being capable of disengagement from the floor plate.

12. The magazine loading device as claimed in claim 1, wherein the device includes detachable panels for reducing dimensions of the transparency chamber, for accommodating transparencies of smaller size.

13. The magazine loading device as claimed in claim 12, wherein the detachable panels are adapted to also reduce dimensions within the device in the region of at least some of the magazine slots.

14. The magazine loading device as claimed in claim 1, wherein the transparency chamber is at least partially transparent to allow monitoring of transfer of the transparencies.

15. The magazine loading device as claimed in claim 1, wherein the slots in the magazine are arranged in a straight line.

16. The magazine loading device as claimed in claim 1, wherein the slots in the magazine are arranged in a circle.

17. A device for loading photographic transparencies into a magazine having transparency slots, the device having:

a transparency chamber adapted to contain at least some of the transparencies and including a floor upon which the transparencies rest;

support means for supporting the transparency chamber above the magazine in use;

feeder means for transferring one of the transparencies from the transparency chamber to one of the slots in the magazine via a feeder gap in the floor, the feeder means comprising a feeder tongue adapted to directly engage and to force a transparency in the transparency chamber downwards through the feeder gap;

a pressure plate adapted to urge transparencies in the transparency chamber towards the feeder gap with sufficient force to prevent any transparency from gravitating through the feeder gap; and slot positioning means for positioning the slot in alignment with the feeder gap, the slot positioning means comprising a spacer member adapted to engage teeth on a bottom of the magazine.

* * * * *